United States Patent [19]

Everaerts et al.

[11] Patent Number: 5,407,971
[45] Date of Patent: Apr. 18, 1995

[54] RADIATION CROSSLINKED ELASTOMERS

[75] Inventors: Albert I. Everaerts, Oakdale; Audrey A. Sherman, St. Paul; Charles M. Leir, Falcon Heights, all of Minn.

[73] Assignee: Minnesota Mining and Manufacturing Company, Saint Paul, Minn.

[21] Appl. No.: 188,453

[22] Filed: Jan. 26, 1994

Related U.S. Application Data

[63] Continuation of Ser. No. 833,152, Feb. 10, 1992, abandoned.

[51] Int. Cl.$^6$ .............................................. C08F 2/46
[52] U.S. Cl. ...................................... 522/35; 522/36; 522/46; 522/110; 522/126; 522/127; 522/130; 522/158; 522/159; 522/904; 522/905
[58] Field of Search ................... 522/35, 36, 46, 110, 522/126, 127, 130, 158, 159, 904, 905

[56] References Cited

U.S. PATENT DOCUMENTS

| | | | |
|---|---|---|---|
| 3,214,492 | 10/1965 | Tocker | 522/905 |
| 3,265,772 | 8/1966 | Tocker | 522/905 |
| 3,865,597 | 2/1975 | Broyde | 252/500 |
| 3,948,667 | 4/1976 | Ichikawa | 522/159 |
| 4,040,923 | 8/1977 | Pacifici | 522/46 |
| 4,165,266 | 8/1979 | Stueben | 428/483 |
| 4,329,384 | 5/1992 | Vesley et al. | 428/40 |
| 4,330,590 | 5/1982 | Vesley | 428/336 |
| 4,379,201 | 4/1983 | Heilmann et al. | 428/345 |
| 4,391,678 | 7/1983 | Freeman | 204/15 |
| 4,602,097 | 7/1986 | Curtis | 549/27 |
| 4,670,309 | 1/1987 | Okada et al. | 427/387 |
| 4,737,559 | 4/1988 | Kellen et al. | 526/291 |
| 5,002,975 | 3/1991 | Loza | 522/46 |

FOREIGN PATENT DOCUMENTS

| | | | |
|---|---|---|---|
| 88842 | 9/1983 | European Pat. Off. | 522/905 |
| 54-057560 | 5/1979 | Japan . | |
| 4-074172 | 3/1992 | Japan . | |
| 1223463 | 2/1971 | United Kingdom . | |

OTHER PUBLICATIONS

Derwent Abstract 92-129045. "New Aryl Ketones . . . ", Kao Corp.

Parker et al., "II. Photoaffinity Probes . . . ", *Journal of Protein Chemistry*, vol. 3, Nos. 5/6, 1985, pp. 479–489.

Primary Examiner—Mark A. Chapman
Attorney, Agent, or Firm—Gary L. Griswold; Walter N. Kirn; Gregory A. Evearitt

[57] ABSTRACT

Disclosed are radiation-crosslinkable elastomeric compositions containing:

(a) an elastomeric polymer containing abstractable hydrogen atoms in an amount sufficient to enable the elastomeric polymer to undergo crosslinking in the presence of a suitable radiation-activatable crosslinking agent; and (b) a radiation-activatable crosslinking agent of the formula:

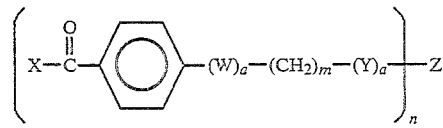

wherein:
W represents —O—, —N—, or —S—;
X represents CH$_3$— or

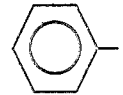

Y represents a ketone, ester, or amide functionality;
Z represents an organic spacer which does not contain hydrogen atoms that are more photoabstractable than hydrogen atoms of the elastomeric polymer;
m represents an integer of 0 to 6;
a represents 0 or 1; and
n represents an integer of 2 or greater.

Radiation-crosslinked elastomers are prepared by exposing the radiation-crosslinkable elastomeric compositions to radiation (e.g., UV light) to abstract hydrogen atoms from the elastomeric polymer by the resulting radiation-activated crosslinking agent.

11 Claims, No Drawings

RADIATION CROSSLINKED ELASTOMERS

This is a continuation of application Ser. No. 07/833,152, filed Feb. 10, 1992, now abandoned.

FIELD OF THE INVENTION

This invention relates to radiation-crosslinkable elastomeric compositions which employ a radiation-activatable crosslinking agent. This invention also relates to radiation crosslinked elastomeric compositions.

BACKGROUND OF THE INVENTION

It is known that crosslinking of polymers produces polymer networks which have quite different mechanical and physical properties compared to their uncrosslinked linear or branched counterparts. For example, polymer networks can show such unique and highly desirable properties as solvent resistance, high cohesive strength, and elastomeric character.

Crosslinked polymers can be made in situ during formation of the desired polymer product, however, since further processing of the polymer product is often necessary, it is more typical to start from the linear or branched polymer which in the final processing step is cured to a crosslinked material. The curing or crosslinking step is typically activated by moisture, thermal energy, or radiation. The latter has found widespread applications, particularly in the use of ultraviolet light as the radiation source.

In the past, a variety of different materials have been used as crosslinking agents, e.g. polyfunctional acrylates, acetophenoneos, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

Certain polyfunctional benzophenones have been investigated as photocrosslinking agents and/or photosensitizers in various photopolymerizable systems.

JP 54/057560 discloses the use of (bis)benzophenone compounds to photocrosslink non-elastomeric materials—in particular, polyester compositions. When incorporated into polyesters, they impart improved tensile strength and elongation to biaxally stretched films of crosslinked poly(ethylene terephthalate). These films also exhibit enhanced weather, heat, and chemical resistance and improved dimensional stability.

U.S. Pat. No. 4,602,097 (Curtis) discloses the use of (bis)benzophenones as photoinitiators and/or photosensitizers in radiation cured coatings. The poly(ethylene oxide) moiety which separates the terminal benzophenone groups allows the claimed compositions to be more soluble than unsubstituted benzophenones in waterborne coating compositions. The (bis)benzophenone compounds, however, contain hydrogen donating groups, such as the methylenes adjacent to the oxygen atoms of the ether functionalities. These hydrogen donating groups undergo an intramolecular hydrogen abstraction by the photochemically excited (bis)benzophenone structure to provide a lower energy radical which is effective as an initiator, but unsuitable as a photocrosslinker.

U.S. Pat. No. 4,379,201 (Heilmann et al.) is an example of a class of polyacrylic-functional crosslinkers used in the photocuring of (meth)acrylate copolymers. U.S. Pat. Nos. 4,329,384 (Vesley) and 4,330,590 (Vesley) describe a class of fast curing triazine photocrosslinkers which, when mixed with an acrylic monomer and, optionally, a monoethylenically unsaturated monomer, and exposed to UV radiation, forms a crosslinked polyacrylate. The crosslinks formed by both the (meth)acrylates and the triazines in these copolymerizations prevent any further processing, such as hot melt coating, reactive extrusion, or solution coating processes, following the initial photopolymerization.

U.S. Pat. No. 4,737,559 (Kellen et at.) discloses acrylate-functional aromatic ketones (in particular, 4-acryloxybenzophenone (ABP)) which are incorporated with other (meth)acrylate monomers to form pressure-sensitive adhesive copolymers containing pendant benzophenone groups. These benzophenone functional pressure-sensitive adhesive copolymers undergo efficient crosslinking upon exposure to UV light, especially when compared to the use of conventional benzophenone as a photocrosslinker. This patent also specifically states that the disclosed compounds must be free of hydroxy groups in a position ortho to the carbonyl functionality. These hydroxy substituents inhibit free-radical formation and hydrogen abstraction from the acrylate copolymer backbone. However, since these acrylate-functional aromatic ketones are monomers to be copolymerized primarily with other acrylic monomers, they are not useful as a post-polymerization photocrosslinker which may be compounded with previously prepared elastomeric polymers of varying chemical character.

A suitable class of radiation-activatable polyfunctional acetophenone and benzophenone crosslinking agents for elastomers has not been recognized or utilized to date and has been lacking in the industry. It was against this background that a search for such a suitable class of radiation-activatable polyfunctional acetophenone and benzophenone crosslinking agents for elastomers was conducted.

SUMMARY OF THE INVENTION

In one embodiment of the present invention there is provided a radiation-crosslinkable composition comprising: (a) an elastomeric polymer containing abstractable hydrogen atoms in an amount sufficient to enable the elastomeric polymer to undergo crosslinking in the presence of a suitable radiation-activatable crosslinking agent; and (b) a radiation-activatable crosslinking agent of the formula:

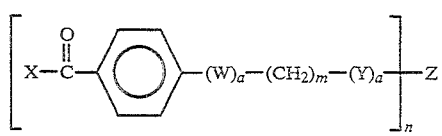

wherein:
W represents —O—, —H—, or —S—,
X represents $CH_3$— or

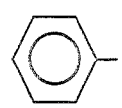

Y represents a ketone, ester, or amide functionality;

Z represents a polyfunctional organic segment which does not contain hydrogen atoms that are more photoabstractable than hydrogen atoms of the elastomeric polymer;

m represents an integer of from 0 to 6;

a represents 0 or 1; and n represents an integer of 2 or greater.

In another embodiment of the present invention there is provided a radiation-crosslinked composition prepared by the process of subjecting the above-disclosed crosslinkable composition to radiation under conditions sufficient to abstract hydrogen atoms from the elastomeric polymer by the radiation-activated crosslinking agent disclosed earlier herein.

So far as is known, no one has previously utilized any of the above-disclosed radiation-activatable polyfunctional acetophenones and benzophenones as crosslinking agents for elastomeric polymers. Additionally, the use of the above-disclosed polyfunctional acetophenones and benzophenones affords a number of advantages as compared to the use of conventional crosslinking agents for elastomers. These advantages include, but are not limited to, lowered volatility of the crosslinking agent due to its higher molecular weight; increased compatibility of the crosslinker through the selection of polyfunctional organic segment; decreased sensitivity of the crosslinkable composition to oxygen; the avoidance of evolution of any toxic or corrosive by-products or discoloration of the final product; and the capability to be used as a post-curing crosslinking additive.

Other aspects, advantages, and benefits of the present invention are apparent from the detailed description, the examples, and the claims.

DETAILED DESCRIPTION OF THE INVENTION

The radiation-crosslinkable compositions used in the present invention are elastomeric polymers ("elastomers") which contain abstractable hydrogen atoms. The abstractable hydrogen atoms will be present in the backbone and/or side chains of the elastomer in an amount sufficient to allow crosslinking of the elastomer upon exposure of the photocrosslinking agent/elastomer mixture to radiation, e.g., electromagnetic radiation, such as ultraviolet ("UV") light. As a general rule, hydrogen atoms are most easily abstracted from tertiary carbon atoms, those on carbon atoms in a position alpha to an oxygen or nitrogen atom (e.g. organic ethers and tertiary amine, s) and those elastomers with terminal or pendant mercapto groups.

In the present invention, an elastomeric polymer or elastomer is defined as being a macromolecular material that returns rapidly to its approximate initial dimensions and shape after substantial deformation by a weak stress and subsequent release of that stress as measured according to ASTM D 1456-86 ("Standard Test Method For Rubber Property-Elongation At Specific Stress"). Examples of elastomers which can be used in the present invention include, but are not limited to, styrene-butadiene rubber (SBR), styrene-isoprene-styrene block copolymers (SIS), styrene-butadiene-styrene block copolymers (SBS), ethylene-propylene-diene monomer rubbers (EPDM), polyisobutylene, natural rubber, synthetic polyisoprene, acrylonitrile-butadiene copolymers, polychloroprene, ethylene-vinylacetate, silicones, and polyacrylates. The preferred elastomers for use in the present invention are polyacrylates, silicones, liquid EPDM rubber, SBS block copolymers, and SIS block copolymers.

The radiation-activatable crosslinking agent utilized in the present invention has the following formula:

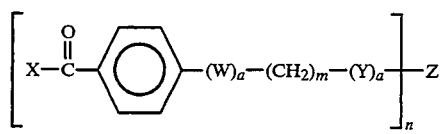

W represents —O—, —N—, or —S—,

X represents $CH_3$— or

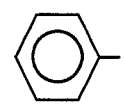

Y represents a ketone, ester, or amide functionality;

Z represents a polyfunctional organic segment which does not contain hydrogen atoms that are more photoabstractable than the hydrogen atoms of the elastomeric polymer;

m represents an integer of from 0 to 6;

a represents 0 or 1; and n represents an integer of 2 or greater.

The synthesis of particular radiation-activatable or photocrosslinking agents is illustrated in the examples which follow, but in general the crosslinking agents can be synthesized according to reactions well known to those skilled in the art of synthetic organic chemistry, e.g. Michael addition, hydrosilylation, transesterification, and condensation reactions.

One preferred group of polyfunctional benzophenone crosslinking agents of this invention are those compounds in which W=—O—, X=phenyl, Y=ester, Z=$(CH_2)_{2-10}$, m=1, a=1, and n=2, and results from the transesterification reaction of 2 molar equivalents of ethyl-(4-benzoylphenoxy)acetate, (Structure I below) with short chain alkylene diols. Another preferred group of polyfunctional benzophenones of this invention are prepared from the reaction of Structure I with an excess of ethylene glycol to form hydroxy-functional benzophenone (Structure II below). Two moles of hydroxy-functional benzophenone then undergo a condensation reaction with an aliphatic, aromatic, or cycloaliphatic polyfunctional isocyanate, resulting in preferred crosslinking agents with urethane and ester functionalities in which m=1; Y=ester; X=phenyl; Z=—$CH_2$—$CH_2$—O—C(O)—NH—R—NH—C(O)—O—$CH_2CH_2$—; W=—O—; and R represents a divalent aliphatic, aromatic, or cycloaliphatic moiety.

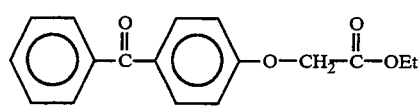

STRUCTURE I

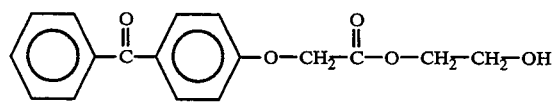

STRUCTURE II

Furthermore, organic spacer segments Z and linking functionalities Y may be prepared to enhance the compatibility and decrease the volatility of the polyfunctional photocrosslinking agents in varying polymeric systems. For example, polyfunctional acetophenones and benzophenones with polysiloxane spacer segments may be synthesized for use in the photocuring of polydimethylsiloxane elastomers, materials in which most non-silicon containing crosslinking agents are incompatible. This incompatibility between polymer and photocrosslinking agents leads to reduced crosslinking efficiency and clarity of immiscible elastomer/crosslinking agent systems.

The organic spacer segment Z may also be selected to modify the rheological and mechanical properties of the radiation crosslinked materials. A rigid spacer group will result in a different rheology than a flexible spacer group. Also, the length of the spacer group may be used to control the crosslink density of the network. Although the spacing of the crosslinking points along the elastomer backbone may not be precisely controlled, the size and chemical nature of the linkage may be determined using the crosslinking agents disclosed herein. As the concentration of crosslinking agent decreases in the photocurable mixture, the properties of the crosslinked elastomeric network become increasingly dominated by the mechanical and rheological properties of the elastomer.

Organic spacer Z must be free of readily abstractable hydrogens, which are present in such functionalities as ethers, thiols, allylic groups, tertiary amines, and the like. When such functionalities are present in the spacer, irradiation will cause hydrogen abstraction at sites along the spacer segment instead of abstracting hydrogens from the elastomeric polymer backbone. This leads to an undesired intramolecular "backbiting" reaction which reduces the photocrosslinking efficiency of multifunctional crosslinkers which contain spacer segments with readily abstractable hydrogens. Thus, the organic spacer Z must not contain hydrogen atoms that are more photoabstractable than the hydrogen atoms of the elastomeric polymer to be crosslinked.

Preferably, about 0.01–25 weight % photocrosslinking agent, and most preferably, about 0.1–10 weight %, is employed based upon the total weight of the elastomer. In general, the amount of photocrosslinking agent employed is based upon the ease of hydrogen abstraction from the elastomeric polymer backbone, the reactivity of the radicals formed, the intensity and length of exposure of the composition to irradiation, and the elastomer's molecular weight.

Other useful materials which can be optionally utilized in the present invention include, but are not limited to, thermally expandable polymeric microspheres, glass microspheres, fillers, pigments, foaming agents, stabilizers, fire retardants, viscosity adjusting agents, and tackifiers/plasticizers which do not interfere with crosslinking.

In practice, the photocrosslinking agent and other ingredients are added to the elastomer, whereupon the material can be coated by methods well-known in the art, such as solvent coating, hot-melt coating, solventless or waterborne coating, and extrusion. The coating is then exposed to radiation, preferably electromagnetic radiation such as UV light, under conditions sufficient to effect crosslinking of the elastomer.

The photocrosslinkers are preferably activated with long wavelength ultraviolet radiation (280–400 nm). The absorption maximum will depend on the molecular structure of the photocrosslinking agent. Due to the low extinction coefficient of benzophenone- and acetophenone-derived structures, it is preferable to use high intensity UV lights for curing. Such UV lights, including the PPG UV processor and Fusion Systems curing unit, are commercially available. The PPG UV processor is equipped with two medium pressure mercury lamps which have a spectral output between 260 and 740 nm, mainly emissions in the 270 to 450 nm output range. The lamps can be set at full power (300 Watts/inch) or half power (150 Watts/inch). The Fusion Systems curing unit uses electrodeless UV lamps with power settings between 100 and 600 Watts/inch. A variety of bulbs are available with differing spectral outputs. The preferred bulbs for the photocrosslinking agents of the invention are the "D" or "H" bulbs, both commercially available from Fusion Systems.

The radiation crosslinked materials are useful as sealants and coating materials, such as inks, adhesives, printing and photographic coatings, paints, semiconductor masks, photoresists, and photodetackifiable adhesives.

TEST PROCEDURES

The following test procedures were used to evaluate the pressure-sensitive materials used in the examples.

Peel Adhesion

Peel adhesion is the force required to remove a coated flexible sheet material from a test panel measured at a specific angle and rate of removal. In the examples, this force is expressed in Newtons per decimeter (N/dm) width of coated sheet. The test follows the procedures found in ASTM D 3330-87 ("Peel Adhesion of Pressure Sensitive Tape at 180° Angle). The only deviations from the ASTM test are the substitution of a glass plate for the steel plate called for in the test and a change in the peel rate. A glass test plate is washed with diacetone alcohol and cleaned with an absorbing material, such as a paper towel. The plate is then dried and washed three more times with heptane. A strip 0.127 dm in width of the sheet coated with the adhesive to be tested is applied to the horizontal surface of the cleaned glass test plate with at least 1.27 lineal dm in firm contact. Three passes in each direction with a 2 kg hard rubber roller is used to apply the strip. If air bubbles are entrapper between the test plate and the test strip, then the sample is discarded. The free end of the coated strip is doubled back nearly touching itself so the angle of removal will be 180°. The free end is attached to the adhesion tester scale. The glass test plate is clamped in the jaws of a tensile testing machine which is capable of moving the plate away from the scale at a constant rate of 2.3 meters per minute. The dwell time after roll down is 30 seconds. The scale reading in Newtons is recorded as the tape is peeled from the glass surface. The data for the first 0.5 dm of the strip is disregarded and the peak, valley, and average peel is recorded for the remainder of the test strip.

Shear Strength

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in minutes required to pull a standard area of adhesive coated sheet material from a stainless steel test panel under stress of a constant, standard load. This test follows the procedure described in ASTM D 3645M-88: "Holding Power of Pressure Sensitive Adhesive Tapes."

The tests were conducted on strips of coated sheet material applied to a stainless steel panel which was cleaned and prepared as described above. A 0.127 dm by 0.127 dm portion of each strip was in firm contact with the panel with one end portion of the tape being free. The panel with the coated strip attached was held in a rack such that the panel formed an angle of 178° with the extended tape free end which was tensioned by application of a force of 1000 grams applied as a hanging weight from the free end of the coated strip. The 2° less than 180° is used to negate any peel forces, thus insuring that only the shear forces are measured, in an attempt to more accurately determine the holding power of the tape being tested. The time elapsed for each coated film to separate from the test panel was recorded as the shear strength. The type of failure, either "adhesive" failures when the adhesive separates cleanly from the panel or backing, or "cohesive" failures in which the sample adhesive leaves residue on both the test panel and backing, is recorded.

Gel fraction

A known amount of polymer was put in an excess of toluene and allowed to dissolve over a 48 hr period. The sample was filtered and the recovered solid was washed a couple times with fresh solvent. The solid was dried and the amount recorded. The gel content was determined as follows:

$$\frac{\text{solid weight}}{\text{initial weight of sample}} \times 100\%$$

EXAMPLES

The following non-limiting examples further illustrate the present invention.

Synthesis of ethyl-(4-benzoyl phenoxy)acetate (EBPA)

This molecule is an important precursor for the synthesis of the multifunctional acetophenone and benzophenone crosslinking agents disclosed in this application. The ethyl-(4-benzoyl-phenoxy)acetate was prepared by refluxing a mixture of 100.0 grams (0.51 moles) 4-hydroxybenzophenone, 85.2 grams (0.51 moles) ethyl bromoacetate and 800 ml of 2-butanone (MEK) in the presence of an excess of potassium carbonate (209 grams or 1.5 moles). After three hours, the carbonate was filtered off and the MEK removed on a rotovapor. The residue was crystallized from isopropyl alcohol to yield a white, flaky product with a sharp melting point of 82° C. The structure was confirmed by NMR.

Synthesis of 1,2-ethanediol(4-benzoyl phenoxy) acetate (EDBPA)

Ethyl-(4-benzoyl phenoxy) acetate was reacted with an excess of ethylene glycol to give a monohydroxy functional compound used in the condensation reaction described in this application. (As such, an aliphatic alcohol is obtained which yields condensation products with higher stability than the phenolic compounds, such as 4-hydroxybenzophenone.)

10 grams of the EBPA was charged to an excess (40 ml) of ethylene glycol, which was dried by removal of a toluene/water azeotrope. A few drops of a 25% solution of sodium methoxide in methanol was charged as a catalyst for the reaction. The mixture was heated for 16 hours at 120° C. After cooling to room temperature, the mixture was poured into water and the product was extracted with ethylacetate. After drying over magnesium sulfate, the solvent was removed to yield a yellowish solid, which could be crystallized from hot toluene. The structure of the white powder was confirmed by NMR.

Synthesis of 1,4-butane-di(4-benzoylphenoxy)acetate ($C_4$-bisBP)

The reaction product described here will be referred to as $C_4$-bisBP throughout this application. The $C_4$ refers to the number of carbons used for the diol.

$C_4$-bisBP was prepared by mixing 10 grams (0.033 moles) of the EBPA with 1.6 grams (0.017 moles) of 1,4-butanediol. The mixture was then stirred with a magnetic bar. A few drops of methanesulfonic acid were added as a catalyst and the mixture was heated to 120° C. under constant agitation. When cooled and washed with isopropanol, a white solid was obtained, which was purified by crystallization from hot toluene. NMR analysis confirmed the structure of the product.

Synthesis of urethane bisbenzophenone (U-bisBP)

A lower molecular weight urethane bisbenzophenone was prepared by dissolving 3 grams (0.01 moles) of EDBPA and 1.31 grams (0.005 moles) dicyclohexylmethane 4,4'-diisocyanate (H12-MDI) in 15 grams of a dry 50/50 solvent mixture of toluene and 2-butanone. Dibutyl tin dilaurate was used as a catalyst. The reaction was monitored by the disappearance of the acetate in GC analysis and the isocyanate IR absorption at about 2270 $cm^{-1}$. After removal of the solvent, a clear, viscous oil was recovered.

Synthesis of a polyester bisbenzophenone (PE-bisBP)

A 5,000 molecular weight polyester bisbenzophenone was prepared by dissolving 10 grams Rucoflex TM S-1014-110 (available from RUCO Polymer Corporation) (hydroxyl number 114.3 and equivalent weight 490.8), 1.8 grams of EDBPA, and 3.4 grams of H12-MDI in 80 grams of 80/20 solvent mixture of toluene/2-butanone. A few drops of dibutyl tin dilaurate were added and the mixture was refluxed for eight hours. GC analysis showed no H12-MDI or monoacetate and the reaction was stopped. Removal of the solvent yielded a highly viscous oil.

Synthesis of PDMS multifunctional benzophenone (PDMS-multiBP)

20 grams of an 8000 molecular weight polydimethylsiloxane polymer containing 4-5 mole % pendant mercaptopropyl groups (KF-2001, available from Shin-Etsu) was mixed in 20 grams of tetrahydrofuran along with 2.52 grams of 4-acryloxybenzophenone (ABP). 0.5 ml of triethylamine was added as a catalyst. This was mixed for 16 hours at room temperature while the disappearance of ABP was followed. When only a trace of ABP was visible, the solution was stripped of solvent and triethylamine on a rotoevaporator. 21.66 grams of a thin clear oil was obtained. This oil was submitted for $C^{13}$NMR and the structure was confirmed. It was noted that only 65% of the mercapto groups were reacted with the ABP and that 35% of these groups were remaining.

Abbreviations

Throughout this application the following abbreviations will be used for the different components:

| | |
|---|---|
| AA | acrylic acid |
| MBA | 2-methyl butyl acrylate |
| IOA | isooctyl acrylate |
| BP | benzophenone |
| ABP | 4-acryloxybenzophenone |
| $C_4$-bisBP | 1, 4-butanedi[4-benzoylphenoxy]acetate |
| $C_{10}$-bisBP | 1, 10-decanedi[4-benzoylphenoxy]acetate |
| $C_{10}$-Methoxy bisBP | 1, 10 decanedi[4-benzoyl-2-methoxyphenyl]acetate |
| U-bisBP | urethane-bisbenzophenone |
| PE-bisBP | polyester bisbenzophenone |
| DG-bisBP | diethyleneglycol (4-benzoyl-phenyl) dicarbonate |
| TG-bisBP | tetraethyleneglycol (4-benzoyl-phenyl) dicarbonate |
| PG-bisBP | polyethyleneglycol (4-benzoyl-phenyl) dicarbonate |
| PDMS | polydimethylsiloxane |
| PDMS-multiBP | PDMS multifunctional benzophenone of 8000 molecular weight |
| Kraton ™ 1107 | styrene-isoprene-styrene block copolymer available from Shell Chemical Co. |
| Vistanex ™ LM-MS | low molecular weight polyisobutylene available from Exxon Chemical Americas |
| Vistanex ™ MM | medium molecular weight polyisobutylene available from Exxon Chemical Americas |
| Trilene ™ 65 | liquid EPDM from Uniroyal Co. |

EXAMPLE 1

A 90/10 IOA/AA copolymer was made by solution polymerization in ethylacetate at 40% solids. The inherent viscosity was measured in ethylacetate and found to be 1.28 dl g$^{-1}$.

0.084 weight percent ($1.48 \times 10^{-4}$ moles) of $C_4$-bisBP was dissolved in the solution polymer to form a clear, homogeneous mixture. The solvent was removed and the 100% solids adhesive was hot-melt coated at 170° C. on 1.5 mil primed polyester. Coating thickness was 1.2 mils. The coatings were UV cured under a PPG processor containing two medium pressure mercury lamps at full setting. The samples were put on a carrier web running at 75 feet per minute through the non-inerted curing chamber. Peel adhesion and shear holding power were measured and the results are summarized in Table 1.

COMPARATIVE EXAMPLE 1

0.054 grams ($2.96 \times 10^{-4}$ moles) benzophenone was dissolved in the same solution used in Example 1 and the solvent was removed to give a clear adhesive. Tape samples were prepared using the same hot-molt coating conditions as above. The tape test results are summarized in Table 1 under "Comparative #1." This example clearly demonstrates the lower crosslinking efficiency of the benzophenone. Although some curing takes place, the desirable high shear holding power seen for Example 1 was unobtainable.

COMPARATIVE EXAMPLE 2

A 90/10/0.075 IOA/AA/ABP terpolymer was made in ethylacetate at 40% solids. The inherent viscosity in ethylacetate was 1.32 dl g$^{-1}$. A tape sample for testing was prepared using the same method as in Example 1. The peel and shear data are summarized in Table 1.

COMPARATIVE EXAMPLE 3

Instead of copolymerizing ABP, 0.075 weight percent ($2.96 \times 10^{-4}$ moles) of ABP was dissolved into the 90/10 solution adhesive from Example 1. A tape sample was prepared and the properties tested. Results are shown in Table 1.

Comparative Examples 1-3 demonstrate the need to copolymerize the benzophenone crosslinker into the elastomeric polymer backbone to get high crosslinking efficiency.

The use of a multifunctional benzophenone crosslinker allows the preparation of a UV-crosslinkable adhesive composition with simple addition of the required crosslinker level to an already existing polymer.

TABLE 1

| | UV curing of acrylate adhesives | | |
|---|---|---|---|
| Example | #UV passes | Peel from glass (N/dm) | Shear (min) |
| 1 | 0 | 70.1 | 231c |
| 1 | 1 | 62.0 | 2,889c |
| 1 | 2 | 62.6 | 10,000+ |
| 1 | 3 | 61.1 | 10,000+ |
| Comp #1 | 1 | 67.2 | 308c |
| Comp #1 | 2 | 64.8 | 423c |
| Comp #1 | 3 | 60.9 | 1,891c |
| Comp #2 | 1 | 61.3 | 1,789c |
| Comp #2 | 2 | 61.5 | 3,872c |
| Comp #2 | 3 | 60.9 | 9,106c |
| Comp #3 | 1 | 67.2 | 418c |
| Comp #3 | 2 | 65.0 | 505c |
| Comp #3 | 3 | 61.7 | 1,376c | c = cohesive failure of the adhesive
+ = indicates that test was terminated at this point
Only the average peel from glass is given.

EXAMPLES 2, 3 and 4

Three different crosslinkers were used for curing a 90/10 IOA/AA solution adhesive with 1.28 dl g$^{-4}$ inherent viscosity of Example 1. The respective multifunctional benzophenones were U-bisBP for Example 2, $C_4$-bisBP for Example 3, and PE-bisBP for Example 4. All the crosslinkers dissolved quite readily in the ethylacetate solutions to form clear, homogenous mixtures. The 40% solids solutions were knife-coated onto 1.5 mil primed polyester and oven dried to give 1.2 mil thick coatings.

The tapes were UV crosslinked (cured) using the same conditions as disclosed in Example 1. The peel and shear properties were measured, the results of which are summarized in Table 2.

TABLE 2

| | Multifunctional benzophenone crosslinkers for solution adhesives. | | | | |
|---|---|---|---|---|---|
| Example | Crosslinker | weight % | #UV passes | Peel from glass (N/dm) | Shear (min) |
| 2 | U-bisBP | 0.075 | 1 | 59.1 | 2,690c |
| 2 | U-bisBP | 0.075 | 2 | 54.7 | 10,000+ |
| 2 | U-bisBP | 0.075 | 3 | 54.7 | 10,000+ |
| 3 | $C_4$-bisBP | 0.075 | 1 | 60.2 | 10,000+ |
| 3 | $C_4$-bisBP | 0.075 | 2 | 56.9 | 10,000+ |
| 3 | $C_4$-bisBP | 0.075 | 3 | 55.8 | 3,150a |
| 4 | PE-bisBP | 0.435 | 1 | 56.9 | 1,350c |
| 4 | PE-bisBP | 0.435 | 2 | 54.7 | 10,000+ |
| 4 | PE-bisBP | 0.435 | 3 | 54.7 | 10,000+ |

TABLE 2-continued

Multifunctional benzophenone crosslinkers for solution adhesives.

| Example | Cross-linker | weight % | #UV passes | Peel from glass (N/dm) | Shear (min) |
|---------|--------------|----------|------------|------------------------|-------------|
|         | none         |          | 0          | 70.0                   | 220c        | c = cohesive failure of the adhesive
a = adhesive failure of the adhesive
= indicates that test was terminated at this point
Average peel from glass shown.

Examples 2, 3, and 4 demonstrate the high crosslinking efficiency obtainable utilizing certain polyfunctional benzophenones.

COMPARATIVE EXAMPLES 4-7

These examples demonstrate the need for a spacer group between the benzophenone units which is free, or essentially free, of easily abstractable hydrogen atoms, such as those found on a polyether.

A 90/10 MBA/AA copolymer with inherent viscosity of 0.5 dl g$^{-1}$ was mixed with three different ethyleneglycol based bisbenzophenones: a diethyleneglycol bisbenzophenone (DG-bisBP) for Comparative Example 5, a tetraethyleneglycol bisbenzophenone (TG-bisBP) for Comparative Example 6 and polyethyleneglycol bisbenzophenone (PG-bisBP) for Comparative Example 7.

Benzophenone itself was also included as a reference (Comparative Example 4). The benzophenone content was kept equivalent for all the crosslinkers and corresponded to a level of 0.3 weight percent benzophenone on solids. All the ethylacetate solutions were clear and homogeneous and adhesive tapes were prepared according to the methods described in previous examples. The coating thickness of the dry adhesive was 1.0 mils. UV curing was done with only one pass through the curing chamber at variable line speeds. The tape properties are summarized in Table 3.

TABLE 3

Ethyleneglycol-based bisbenzophenones and acrylate curing

| Example  | Cross-linker | line speed (ft/min) | shear (min) |
|----------|--------------|---------------------|-------------|
| Comp. #4 | BP           | 25                  | 10,000+     |
| Comp. #4 | BP           | 75                  | 250c        |
| Comp. #4 | BP           | 125                 | 250c        |
| Comp. #5 | DG-bisBP     | 25                  | 10,000+     |
| Comp. #5 | DG-bisBP     | 75                  | 10,000+     |
| Comp. #5 | DG-bisBP     | 125                 | 10,000+     |
| Comp. #6 | TG-bisBP     | 25                  | 10,000+     |
| Comp. #6 | TG-bisBP     | 75                  | 2,000c      |
| Comp. #6 | TG-bisBP     | 125                 | 250c        |
| Comp. #7 | PG-bisBP     | 25                  | 250c        |
| Comp. #7 | PG-bisBP     | 75                  | 250c        |
| Comp. #7 | PG-bisBP     | 125                 | 250c        | c = cohesive failure of the adhesive
+ = indicates that test was terminated at this point The clear decrease in UV curing efficiency can be associated with the number of easily abstractable hydrogens in the crosslinkers (e.g., the number of ether linkages).

EXAMPLES 7-9

These examples demonstrate the crosslinking of non-acrylic elastomers with the multifunctional benzophenones used in the present invention. The elastomers listed in Table 4 were dissolved at 10% or 20% solids (depending on the molecular weight of the polymer) in toluene and C$_{10}$-bisBP was added to these solutions. The C$_{10}$ spacer was selected for solubility reasons, with the C$_4$ equivalent giving us cloudy solutions. All the solutions were cast to give clear elastomer films, with the only the Kraton TM 1107 elastomer samples being slightly hazy.

The elastomers were cured under two medium pressure mercury lights of a PPG UV processor. The lamps were at full setting and the samples were each given three passes through the unit at 75 fpm line speed. The gel content was determined by the toluene extraction described above. The results are summarized in Table 4.

TABLE 4

UV crosslinking of elastomers with C$_{10}$-bisBP

| Example | Elastomer       | weight % crosslinker | % gel        |
|---------|-----------------|----------------------|--------------|
| 7       | Vistanex TM LM-MS | 2                  | none detected |
| 7       | Vistanex TM LM-MS | 5                  | <5           |
| 8       | Vistanex TM MM    | 2                  | 38           |
| 8       | Vistanex TM MM    | 5                  | 52           |
| 9       | Kraton TM 1107    | 2                  | 84           |
| 9       | Kraton TM 1101    | 2                  | 83           |

These data demonstrate the UV crosslinking efficiency of the multifunctional benzophenones in non-acrylic elastomers. The data also show that crosslinking efficiency depends on the ease of hydrogen abstraction from the backbone, the reactivity of the resulting radicals, and the molecular weight of the elastomer. Example 10 demonstrates the high crosslinking efficiency obtainable with a photosensitive, elastomeric sheet.

EXAMPLE 10

A photosensitive, elastomeric sheet was prepared as follows:

5 weight percent (on a solids basis) of C$_{10}$-bisBP was dissolved in a 20% solids solution of Kraton TM 1107 elastomer in toluene. The sample was cast on a primed polyester sheet and oven dried to give a 5 mil thick film. Part of the sheet was covered with aluminum foil and the sample was cured in a non-inerted PPG UV processor equipped with two medium pressure mercury lamps at full setting. The exposure time was about 6 seconds. Subsequently, the mask was removed and the sample was immersed in toluene. In a matter of minutes, the non-exposed part dissolved, whereas the exposed part showed only some swelling. The boundary between exposed and non-exposed area was well defined.

EXAMPLE 11

A photosensitive sheet was prepared according to the method described in Example 10. Instead of a 20% solids Kraton TM 1107 elastomer solution, a 50% solids Trilene TM 65 solution was used to cast the sample. The curing was done as described in Example 10 and again, the non-exposed part dissolved readily in the toluene, whereas the exposed part showed some swelling.

EXAMPLE 12

This example demonstrates the non-volatile nature and stability of a multifunctional benzophenone crosslinker. Since it can be expected that higher molecular weight analogues are even less volatile, C4-bisBP was used. Comparison was made to a copolymerizable benzophenone (ABP), which needs to be incorporated in the polymer prior to extrusion; and benzophenone itself, which can be post added to a hot-melt coatable polymer.

To determine the effect of extended heating on the crosslinking efficiency of an acrylate adhesive, tape samples were open face stored in an oven at 105° C. for 12 hours. The coating thickness of the adhesive was about 1.2 mils. Typically higher temperatures are used for hot-melt coating, but this temperature was selected to avoid polymer degradation. The tapes tested were the ones used for Example 1 and Comparative Examples 1 and 2.

TABLE 5

Heat effects on crosslinking efficiency of benzophenones in acrylate adhesives

| Sample | Heat treated | Peel from glass (N/dm) | Shear (min) |
|---|---|---|---|
| Comp #1 | no | 60.4 | 1,530c |
| Comp #1 | yes | 65.7 | 517c |
| Comp #2 | no | 60.2 | 9,816c |
| Comp #2 | yes | 59.8 | 10,000+ |
| Ex. 1 | no | 59.8 | 10,000+ |
| Ex. 1 | yes | 60.4 | 10,000+ | c = cohesive failure of the adhesive
+ = indicates that test terminated at this point
Only the average peel value from glass is given.

From the results in Table 5 it is clear that unless the benzophenone crosslinker is copolymerized or a non-volatile multifunctional benzophenone crosslinker is used, a loss in crosslinking efficiency is to be expected for a hot-melt processed elastomeric composition which is heated for an extended period of time. The multifunctional benzophenone crosslinker content of the elastomer can be tailored to any desired level by simple addition or elimination of reagent from the melt, thereby offering a distinct advantage over the copolymerizable ABP.

EXAMPLE 13

A PDMS elastomer was dissolved in a 60/40 toluene/2-propanol mixture of 20% solids. Two different bisbenzophenones ($C_{10}$bis-BP and $C_{10}$methoxy bis-BP) and one multifunctional benzophenone (PDMS-multiBP) were added at 5% by weight and allowed to dissolve. The solutions were cast to give elastomer films 2 mils in thickness. Only the solution containing PDMS-multiBP gave a clear film.

The elastomers were cured under two medium pressure mercury lamps of a PPG processor. The lamps were at full setting and the samples were each given three passes through the unit at 75 ft./min. line speed.

The gel content was determined by the toluene extraction method described above. The results are summarized in Table 6.

TABLE 6

| PDMS-based multifunctional crosslinkers | |
|---|---|
| Crosslinker | % gel |
| $C_{10}$-bisBP | 6 |
| $C_{10}$-methoxy bisBP | 6 |
| PDMS-multiBP | 98 |

These data demonstrate the need for a compatible spacer group to obtain greater crosslinking efficiency.

Reasonable variations and modifications are possible from the foregoing disclosure without departing from either the spirit or scope of the invention as defined in the claims.

We claim:

1. A radiation-crosslinkable composition consisting essentially of:

(a) an elastomeric polymer containing abstractable hydrogen atoms in an amount sufficient to enable the elastomeric polymer to undergo crosslinking in the presence of a suitable radiation-activatable crosslinking agent; and
    (b) a radiation-activatable crosslinking agent of the formula:

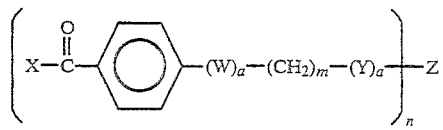

wherein:
W represents —O—, or —N—;

X represents $CH_3$— or

Y represents

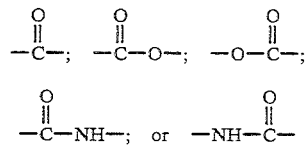

with the proviso that when m=0, Y represents

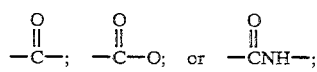

Z represents an organic spacer selected from the group consisting of aliphatic, aromatic, cycloaliphatic or urethane groups free of ethers, thiols, allylic groups, and tertiary amines;
m represents an integer of 0 to 6;
a represents 1; and
n represents 2.

2. A radiation-crosslinkable composition according to claim 1 wherein the elastomeric polymer is a macromolecular material that returns rapidly to its approximate initial dimensions and shape after substantial deformation by a weak stress and subsequent release of that stress as measured according to ASTM D 1456-86.

3. The radiation-crosslinkable composition according to claim 1 wherein: X represents phenyl; W represents —O—; Y represents

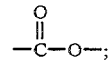

Z represents $(CH_2)_{2-10}$; and m=1.

4. The radiation-crosslinkable composition according to claim 1 wherein: X represents phenyl; W represents —O—; Z represents —$CH_2$—$CH_2$—O—C(O)—N-

H—R—NH—C(O)—O—CH$_2$CH$_2$—; R represents a divalent aliphatic, aromatic, or cycloaliphatic moiety; Y represents

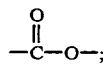

and m=1.

5. The radiation-crosslinkable composition according to claim 1 wherein said radiation-activatable crosslinking agent is present in an amount of from 0.01–25 weight percent, based upon the total weight of said radiation-crosslinkable composition.

6. The radiation-crosslinkable composition according to claim 1 wherein said radiation-activatable crosslinking agent is present in an amount of from 0.1–10 weight percent, based upon the total weight of said radiation-crosslinkable composition.

7. The radiation-crosslinkable composition according to claim 1 further containing additives selected from the group consisting of: thermally expandable polymeric microspheres; pigments; foaming agents; stabilizers; fire retardants; viscosity adjusting agents; tackifiers; and plasticizers.

8. A radiation-crosslinked composition prepared by the process of subjecting the radiation-crosslinkable composition of claim 1 to radiation in an amount sufficient to abstract hydrogen atoms from said elastomeric polymer by the resulting radiation-activated crosslinking agent.

9. A radiation-crosslinked elastomeric composition according to claim 8 wherein said radiation is electromagnetic radiation.

10. A radiation-crosslinked elastomeric composition according to claim 8 wherein said radiation has a wavelength in the range of about 280 to 400 nm.

11. The radiation-crosslinkable composition according to claim 1 wherein said radiation-activatable crosslinking agent is 1,4-butanedi(4-benzoylphenoxy) acetate.

* * * * *